Nov. 19, 1968  J. W. COOK  3,411,332
TEMPERATURE CONTROL APPARATUS AND METHOD FOR OPERATING
A REDUCTION ROLLING MILL
Filed Nov. 10, 1966  2 Sheets-Sheet 1

WITNESSES
Theodore F. Wrobel
Irwin A. Shaw

INVENTOR
John W. Cook
BY P.J. Brodahl
ATTORNEY

United States Patent Office 3,411,332
Patented Nov. 19, 1968

3,411,332
TEMPERATURE CONTROL APPARATUS AND METHOD FOR OPERATING A REDUCTION ROLLING MILL
John W. Cook, Williamsville, N.Y., assignor to Westinghouse Electric Corporation, Pittsburgh, Pa., a corporation of Pennsylvania
Filed Nov. 10, 1966, Ser. No. 593,471
9 Claims. (Cl. 72—9)

ABSTRACT OF THE DISCLOSURE

An electric roller hearth furnace is installed on the mill entry table prior to the first finishing stand of a plural stand rolling mill. The furnace temperature is controlled in coordination with the mill acceleration rate and the workpiece schedule so that the mill is accelerated in a predetermined manner in cooperation with the operation of the furnace to maintain substantially constant delivery temperature from the last stand of the mill throughout the full length of the workpiece.

---

Figure 1:
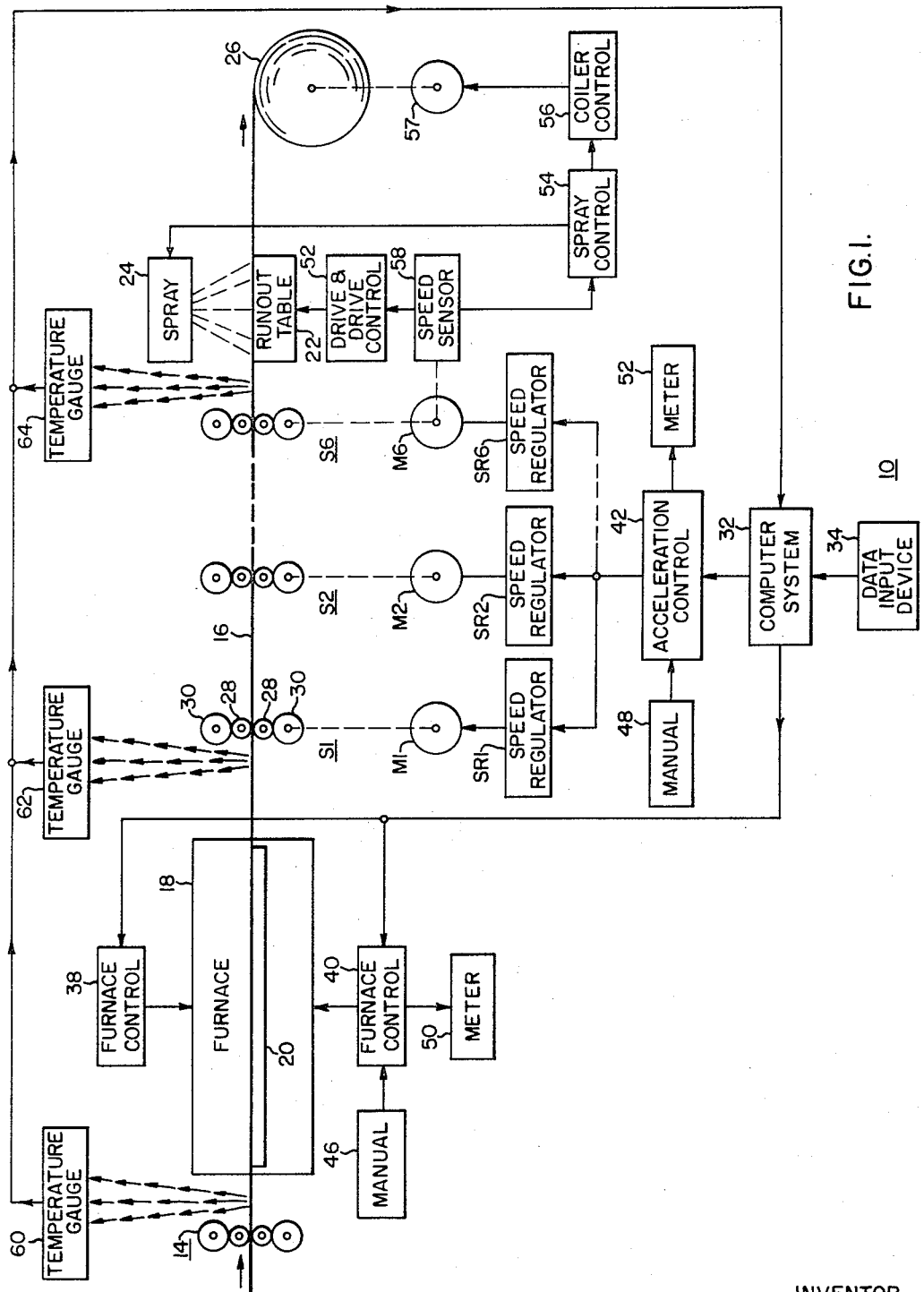

The present invention relates to control systems and methods for reduction rolling of metal workpieces or other materials, and more particularly to hot reduction rolling mills in which delivery temperature of the rolled workpiece is controlled by at least speed variation and a workpiece heating furnace either individually or in combination.

It is well known that the delivery temperature of hot rolled metallic workpiece such as a strip is a determinant of the metallurgical quality of the delivered product. For example, low carbon steel is generally characterized with its best range of metallurgical and other properties, if it is rolled from a hot bar to a finished strip at a delivery temperature approximately in the range of 1500–1600° F. The particular delivery temperature or range of delivery temperatures at which any particular metallic workpiece is rolled to optimize a particular desired property or to optimize particular groups of such properties is usually empirically determined and is dependent on the makeup of the material. In the following discussion, delivery temperature is meant to refer to the workpiece temperature as the strip is delivered from the last hot working point such as the last stand in the hot strip finishing mill. Entry temperature is that temperature of the strip just previous to entry to the finishing stands. Coiling temperature refers to the temperature of the strip as it is being coiled on a downcoiler and is usually controlled by a water spray or other cooling means over the runout table. The strip delivery temperature and the strip coiling temperature are desirably separately controlled since they produce separate effects on the workability and other properties of the finished strip product.

Since strip delivery temperature is a significant factor in quality control of hot rolled strip, and since delivery temperature can vary because of varying ambient heat losses and varying entry and operating conditions for various workpiece operations, some degree of delivery temperature determination or control is required, at least to maintain the rolled product within an acceptable range of quality. In the typical conventional approach, the mill operator enters workpiece bars into the mill with an estimated or known entry temperature and geometry at a known mill speed and, by interpretation of temperature-speed prediction curves or simply by experimental expertise the entire workpiece is rolled into strip normally without strip delivery temperature dropping below a predetermined minimum value even though the material undergoes ambient cooling throughout the rolling time. Although the entire strip may thus have generally acceptable quality, it is characterized with substantial non-uniformity in properties and quality along its length solely because the strip delivery temperature is not adequately controlled and is permitted to drop from the leading to the trailing strip ends. The actual practice under this conventional approach only a relatively small portion of the strip may actually have the desired optimal characteristics. Furthermore, errors in judgment as to the entry slab parameters can result in inferior rolled products which either require subsequent annealing or are totally unacceptable.

In the past few years mill installations have been geared to higher speed operation and equipped with power to allow rolling of larger coils. Since it is not possible to thread a downcoiler at speeds much in excess of 2000 f.p.m., it is standard practice to thread at some lower speed and then accelerate to speeds in the 3000 to 4000 f.p.m. range. To maintain a constant delivery temperature over the entire length of the strip under these conditions presents a formidable control problem. If the mill accelerates too rapidly the delivery temperature will overshoot and be too high whereas on long coils, the workpiece strip may become too cold on the tail end due to heat loss on the entry table leading to the rolling mill. As such, the size of coil which can be rolled on a mill is decidedly limited by these latter factors.

In accordance with the principles of the present invention, a temperature control is provided which will better control the delivery temperature of the workpiece strip even on extremely long rolling cycles. This is especially important in light of the rapid progress being made in continuous casing whereby a longer coil becomes practical. It would be most desirable to roll coils on hot mills as large as those on cold mills which now have a maximum outside diameter of 90 inches or have a weight of 1600 lbs./in. width. With the proposed system these limits could easily be exceeded.

The desired temperature control is achieved by an electric roller hearth furnace installed on the mill entry table between the previous rougher mill and the first finishing stand of the rolling mill where the temperature control is installed. The purpose of this furnace is twofold: (1) heat loss from the workpiece is limited by increasing the ambient temperature, and (2) the atmosphere surrounding the steel workpiece is controlled to limit the amount of oxide or scale formed.

Control of the furnace temperature would be coordinated with the mill acceleration rate and the workpiece schedule being rolled so that the mill would be accelerated in a predetermined manner in cooperation with the operation of the electric furnace to maintain a substantially constant delivery temperature from the last stand of the mill throughout the full length of the workpiece strip thereby allowing a higher production rate. A desirable method and system of mill acceleration control is described in copending application Ser. No. 499,493 entitled "Temperature Control System And Method For Operating A Reduction Rolling Mill," by John W. Cook and assigned to the same assignee as the present invention.

It is therefore, an object of the present invention to provide an improved and novel control system and method for a reduction rolling mill which efficiently operates the mill to provide improved workpiece uniformity and quality in rolled products.

An additional object of the invention is to provide a novel control system and method for a hot strip reduction rolling mill which more efficiently operates the mill under open or closed loop acceleration and ambient temperature control to better regulate the strip delivery temperature to a substantially constant value or within a predetermined range of values thereby to produce improved uniformity of product quality.

It is another object of the invention to provide a novel control for a hot strip reduction rolling mill wherein the atmosphere about the workpiece can be better controlled for regulating the degree of oxidation or scaling on the workpiece.

It is a general object of the present invention to provide a more desirable improved control apparatus and method for regulating the strip delivery temperature in a hot strip rolling mill and particularly for holding the strip delivery temperature more constant so as to produce more substantially uniform product quality along the rolled strip length.

Figure 2:
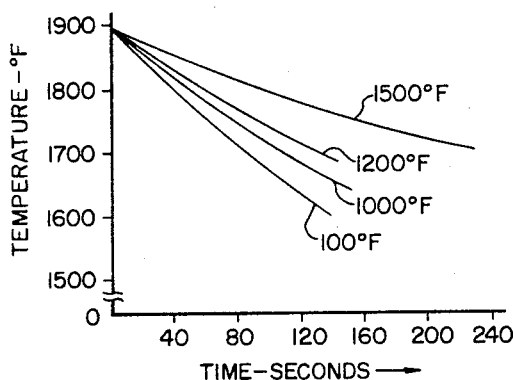
Figure 3:
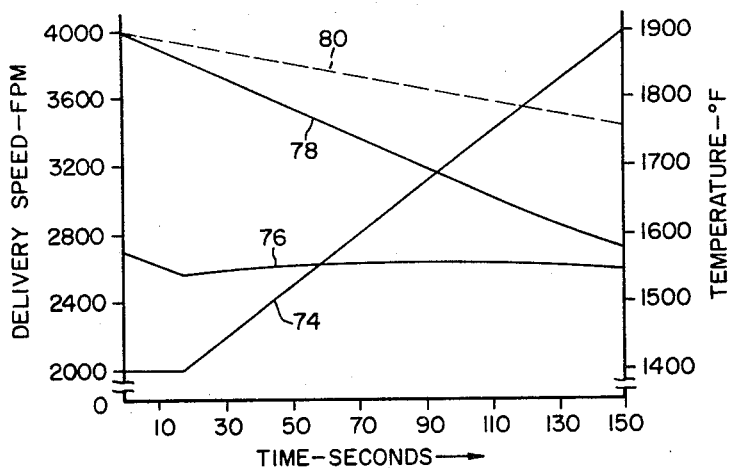
Figure 4:
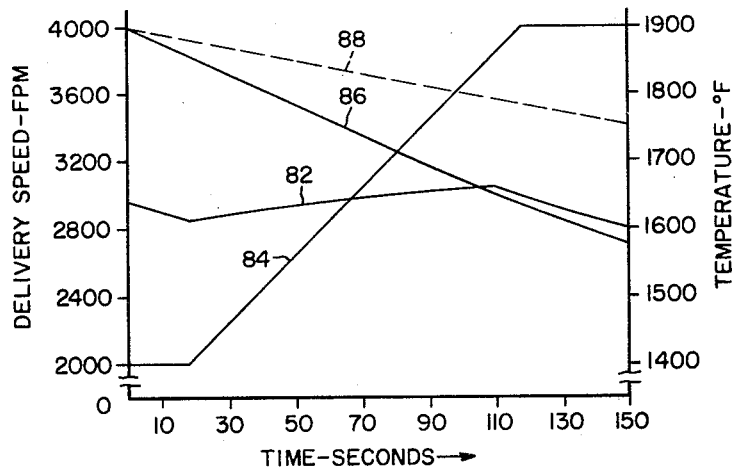

These and other objects of the invention will become more apparent upon consideration of the following detailed description along with the attached drawing, in which:

FIG. 1 is a schematic diagram of a control arrangement for a hot strip steel reduction rolling mill operated in accordance with the principles of the present invention, and FIG. 2 shows an exemplary temperature decrease of a 1.25 inch bar as a function of time at various ambient temperatures, and FIGS. 3 and 4 show speed and entry and delivery temperature curves during rolling of a 1.25 inch bar.

More specifically, in FIG. 1 there is shown a hot strip reduction and finishing rolling mill 10 for which a control system in accordance with the present invention is provided. The mill 10 includes a plurality of rolling stands S1 and S2–S6 through which strip 16 is passed for gauge reduction. A greater or fewer number of rolling stands can be provided in the mill 10 if desired. The last stand 14 of a previous rougher mill is shown. Interposed between the last rougher stand 14 and the rolling stand S1 is a roller hearth furnace 18 surrounding all or a portion of any workpiece positioned on the mill entry table 20. The strip 16 passes from the last stand S6 of the mill 10 to a runout table 22 where a water spray 24 or other suitable cooling device controls the temperature at which the strip is coiled onto a downcoiler 26. In this instance, the mill 10 is a hot strip steel mill which rolls the strip 16 from bars exited from the last rougher 14 and entered into the first stand S1, but other generally similar mills can be arranged to roll steel or other plastically deformable materials in accordance with the principles of the present invention.

At each stand location, a pair of work rolls 28 and a pair of backup rolls 30 are provided in a conventional manner. Respective motor drives M1–M6 are provided at the stand locations to drive the work rolls 28 and transport the strip 16 through the mill 10. The gauge reduction produced by the various work rolls 28 can be set by controlling the size of the respective work roll openings through the application of the well known gauge control techniques.

Overall mill control preferably is provided by a process computer system 32 suitably designed and programmed to provide the degree of digital process control desired. A data input device 34 such as a commerically available tape reader or card reader provides initial data on input and output strip characteristics and other system parameters. The computer system 32 can provide logic control signals setting a reference speed for each stand and the speed regulators SRL–SR6 operate to maintain the reference stand speeds. Successive stand speeds are progressively greater to transport the strip 16 smoothly as it is reduced in thickness. The proportional ratios of the respective stand speeds remain substantially constant once set for a particular workpiece even though the mill may accelerate or decelerate as a whole. The computer system also operates furnace controls 38 and 40 for controlling the temperature of furnace 18 in accordance with the information received from the data input device 34 and the desired operating characteristics.

In accordance with the method principles of the present invention, the strip 16 is exited from the last rougher 14 onto the mill entry table 20. As the workpiece remains on the table 20 the atmosphere about the workpiece is entirely controlled by the surrounding furnace 18 such that a controlled and desired ambient temperature is maintained. At a particular time the workpiece 16 is entered into and through the finishing stands S1–S6 at a first or threading speed preferably until the strip leaves the last stand or until the workpiece 16 is threaded into the downcoiler 26. Although conventionally the workpiece 16 would lose heat during the pre-entry and the rolling time period to provide undesired delivery temperature rundown, in the present case by controlling the heat loss of the workpiece strip on the mill table 20 and by controlling the acceleration of the mill from a threading speed toward or to a predetermined run speed, effective regulation of delivery temperature is maintained from the last stand S6. The delivery temperature is preferably held substantially constant at a predetermined value to provide optimum metallurgical product.

In a typical workpiece, strip delivery temperature rundown forms a somewhat uniform gradient, and the acceleration rate is, therefore, preferably continuously held at a substantially constant value once mill speed is initiated. It is also preferred that the acceleration rate be relatively small for maintaining optimum product. In this regard, minimizing heat loss on the mill entry table can be of considerable advantage since smaller acceleration rates can be used over a longer period of time thus allowing for rolling of extremely long workpieces.

For example, once the length of the finished workpiece is determined, the mill acceleration rate can be computed such that the mill will attain full speed as the tail end of the workpiece strip is coiled by the downcoiler. The rate of heat loss from the workpiece is a function of the mill speed and can be empirically determined for any given speed. Knowing in advance the desired delivery temperature and subtracting the heat added through the work forces at the finishing stand, a desired entry temperature can be determined. This entry temperature can then be used to determine the ambient temperature to be generated by the furnace in order to obtain the desired entry temperature.

To effect the described mill operation, furnace controls 38 and 40 and acceleration control 42 are provided for controlling the mill entry temperature and the acceleration rate reference signal respectively for the stand speed regulators SR1–SR6. The furnace controls 38 and 40 may include a logic circuit designed to provide a plurality of voltage reference signals each associated with a particular furnace temperature. In a similar manner the acceleration control 42 may include a logic circuit designed to provide a plurality of output acceleration rate reference signals each associated with a particular mill acceleration rate. The preselected mill operation is controlled by generating reference signals for both the furnace control and the acceleration control in accordance with the operating parameters of the mill and the characteristics of the workpiece.

A manual input 46 to the furnace control and a manual input 48 to the acceleration control may also be used optionally to control the operation of the mill through changes in the furnace temperature and the acceleration rate respectively. Meters 50 and 52 at the mill operator's control panel can provide a continuous indication of operating conditions.

As the stand drives are accelerated, the runout table drive 52 and the spray control 54 along with the coiler control 56 are also accelerated by a speed sensor 58 coupled to the last stand motor drive M6. The speed sensor 58 is suitably arranged to produce a reference signal which causes the runout table and coiler speeds approximately to follow the mill speed on mill acceleration or mill deceleration to hold coiler tension substantially constant. The sprayer 24 is suitably controlled to provide the cooling effect needed to maintain desired coiling temperature as the strip 16 is coiled during the entire threading and acceleration and deceleration period of mill operation. The limit rate of spray cooling can in some cases limit the maximum mill acceleration rate.

When the computer system 32 is employed to operate the mill, a suitable temperature gauge 60, such as a pyrometer or the like provides a temperature indication of the workpiece as it exits from the rougher 14 or this can be predicted empirically by well known formulae. Knowing this temperature, the computer, in conjunction with the data from the data input device 34 concerning the length of the workpiece and the desired reduction, can set the furnace control to provide a suitable entry temperature at the first stand S1. Another temperature gauge 62 is positioned to measure the entry temperature and provide feedback to the computer system for further refinement in the furnace control signal for either increasing or decreasing the furnace temperature as required. As the strip delivery from the last stand S6 begins, a temperature gauge 64 provides a delivery temperature signal to the computer system 32 for adaptive feedback control of the acceleration rate reference signal set by the acceleration control 64 for delivery temperature regulation. Feedback from the acceleration control 42 to the computer system 32 provides for a comparison of command acceleration rate and existing acceleration rate.

In FIG. 2, a graph is set forth illustrating the temperature rundown as a function of time for a 1.25 inch bar on a hot strip mill entry table 20 at various ambient temperatures. As might be expected the higher the surrounding or ambient temperature about the workpiece, the less temperature gradient will occur and thus the rate of heat loss is considerably lessened. In practical terms, then it would necessarily follow that maintaining a higher ambient temperature about the workpiece on the delay table will be of considerable value in that longer workpieces may be rolled since there will be a longer time before the entry temperature at the first stand S1 will fall below the allowable limit required for rolling.

FIG. 3 depicts curves for entry and delivery temperature and speed as a function of time for rolling a 1.25 inch bar to a 0.050 strip in a six-stand finisher having an ambient temperature at table 20 of 100° F. and with no temperature and acceleration control such as provided by the teachings of the present invention. After the workpiece is threaded during an interval of 18 seconds, a constant acceleration of 15 feet per minute per second is applied for the remainder of the workpiece as shown by curve 74. The finishing temperature as shown by curve 76 throughout the rolling operation is substantially constant once threading has occurred, however, there is a gentle negative slope to this curve during the last 20 seconds which would become increasingly negative had the workpiece been longer. The entry temperature of the strip when it enters the first stand is shown by the curve 78. It is apparent that this rate of acceleration is suitable for a workpiece of 4000 feet or less since the delivery temperature can be substantially maintained over the entire rolling operation. In an effort to roll the workpiece strip to obtain a more uniform product, it may be desirable in some cases to roll the workpiece at a significantly higher finishing temperature by either increasing the rate of acceleration to lessen the time the workpiece is in the finishing stands and thereby reduce heat loss, or by shifting the decay curve of entry temperature from curve 78 to curve 80. By maintaining a higher entry temperature, as shown by curve 80, it would necessarily follow that a desirable delivery temperature would not have to be maintained with an increased acceleration rate to overcome the heat loss from the workpiece during rolling; moreover, a lower and more desirable rate could be maintained throughout the entire rolling operation. This would similarly be a solution to the rolling of workpieces of greater than 4000 feet in length since by decreasing the acceleration rate and at the same time keeping it constant over the entire rolling operation, a substantially constant delivery temperature can be maintained as the entry temperature will decay at a much slower rate. In this manner the maintaining of a constant delivery temperature is more of a function of a less severe decay curve for entry temperature rather than a dependency upon a temperature increase through acceleration.

FIG. 4 is another illustration of entry and delivery temperature curves during acceleration of 20 feet per minute per second versus time from rolling a 1.25 inch bar to a 0.075 inch strip in a six stand finishing mill and a 100° F. ambient temperature. As can be seen from the curve 82 the delivery temperature is held to an average of approximately 1640° F. over the entire rolling operation. For purposes of comparison, an entry temperature decay curve 88 for an ambient of 1500° F. is shown as well as the similar curve 86 for 100° F. ambient temperature. Using an acceleration rate of 20 feet per minute per second as shown by curve 84, the maximum speed of the mill is reached approximately 32 seconds before the entire workpiece is passed through the mill. After the mill has reached its maximum speed, the delivery temperature begins to drop off rapidly. Unless the acceleration and temperature control teachings of the present invention are used, any workpiece of length greater than that used here would be rolled at constantly decreasing delivery temperature thus resulting in significant non-uniformities in the end product.

The shift of the entry temperature curves as seen in FIGS. 3 and 4 is accomplished through the proposed roller hearth furnace which would be installed on the mill delay or entry table. This furnace may be heated electrically by resistance type heaters. The primary function of this furnace will not be that of adding heat to the workpiece, but rather to limit the heat loss from the workpiece by increasing the ambient temperature about the bar. It should be noted, however, that under certain circumstances it may be advantageous to use the furnace both as a means of increasing the ambient temperature around the workpiece and should the workpiece fall below a certain prescribed temperature level to then add heat thereto. Control of the furnace temperature would be coordinated with the mill acceleration rate in the schedule being rolled such that the mill would be accelerated in a fashion to maintain desired delivery temperature throughout the full length of the workpiece strip, and production rate of the mill would then be held as high as possible. The initial rate may be programmed by the computer and then, by using a suitable temperature sensing device, the strip delivery temperature could be used to modify the initial acceleration rate.

The foregoing description has been presented only to illustrate the principles of the invention. Accordingly, it is desired that the invention not be limited by the embodiment described, but, rather, that it be accorded an interpretation consistent with the scope and spirit of its broad principles.

I claim as my invention:

1. A control system for a multi-stand workpiece rolling mill having a motor drive for each stand and a speed regulator for each motor drive and including heat supply means immediately preceding said stands, said system comprising control means for controlling the speed regulators and said heat supply means, and feedback means operative with said control means to control the acceleration of the mill and to control the ambient temperature of the workpiece passing through said heat supply means to regulate workpiece delivery temperature from the rolling mill within a predetermined range.

2. A control system as set forth in claim 1 wherein said feedback means includes a delivery temperature detector and coupled means responsive to said detector for controlling said speed regulator control means.

3. A control system as set forth in claim 1 wherein said feedback means includes a delivery temperature detector and means responsive to said detector for controlling the heat output of said heat supply means.

4. A control system as set forth in claim 1 wherein said feedback means includes a temperature detector at the entry to the heat supply means for controlling the workpiece temperature and the rate of acceleration of the workpiece as it passes through said stands.

5. A control system as set forth in claim 1 wherein said feedback means includes an entry temperature sensing device positioned in proximity to the first stand of the rolling mill, and means responsive to said temperature detector.

6. A control system as set forth in claim 1 with the rolling mill including an entry delay table wherein said heat supply means controls the atmosphere of the workpiece on said entry delay table thereby regulating the degree of oxidation of said workpiece.

7. In a method for operating a multi-stand hot strip reduction rolling mill to reduce the thickness of a workpiece and having a motor drive for each stand and a speed regulator for each motor drive, the steps of said method comprising operating the mill at a first speed, accelerating the mill toward a higher run speed controlling the ambient temperature adjacent to the workpiece prior to the entry of said workpiece into the rolling mill, and controlling the acceleration rate of the rolling mill to regulate strip delivery temperature substantially within a predetermined temperature range.

8. A mill operating method as as forth in claim 7 wherein the method steps further comprise detecting the delivery temperature of the workpiece leaving the rolling mill and controlling the acceleration rate of the rolling mill and the ambient temperature of the workpiece prior to entry into the rolling mill.

9. A mill operating method as set forth in claim 7 wherein the method steps further comprise controlling said ambient temperature in such a manner as to achieve a substantially uniform delivery temperature of the workpiece from the rolling mill.

References Cited

UNITED STATES PATENTS

| | | | |
|---|---|---|---|
| 2,139,483 | 12/1938 | Badlam | 72—202 |
| 3,044,330 | 7/1962 | Roberts | 72—200 |
| 3,109,330 | 11/1963 | Barnitz et al. | 72—19 |
| 3,252,693 | 5/1966 | Nelson | 266—3 |
| 3,267,709 | 8/1966 | O'Brien | 72—13 |
| 3,358,743 | 12/1967 | Adams | 164—273 |

FOREIGN PATENTS

| | | |
|---|---|---|
| 1,209,983 | 2/1966 | Germany. |

CHARLES W. LANHAM, *Primary Examiner.*